(12) United States Patent
Wang

(10) Patent No.: US 10,767,881 B2
(45) Date of Patent: Sep. 8, 2020

(54) METHOD AND DEVICE FOR CONTROLLING A COMPRESSOR

(71) Applicants: GD MIDEA AIR-CONDITIONING EQUIPMENT CO., LTD., Foshan (CN); MIDEA GROUP CO., LTD., Foshan (CN)

(72) Inventor: Yong Wang, Foshan (CN)

(73) Assignees: GD MIDEA AIR-CONDITIONING EQUIPMENT CO., LTD., Foshan (CN); MIDEA GROUP CO., LTD., Foshan (CN)

(*) Notice: Subject to any disclaimer, the term of this patent is extended or adjusted under 35 U.S.C. 154(b) by 79 days.

(21) Appl. No.: 15/981,729

(22) Filed: May 16, 2018

(65) Prior Publication Data

US 2018/0283717 A1 Oct. 4, 2018

Related U.S. Application Data

(63) Continuation of application No. PCT/CN2017/078823, filed on Mar. 30, 2017.

(30) Foreign Application Priority Data

Mar. 30, 2017 (CN) .......................... 2017 1 0206599

(51) Int. Cl.
| | |
|---|---|
| *F24F 11/30* | (2018.01) |
| *F24F 11/38* | (2018.01) |
| *F25B 49/00* | (2006.01) |
| *F25B 49/02* | (2006.01) |
| *F24F 11/86* | (2018.01) |
| *F24F 110/12* | (2018.01) |

(52) U.S. Cl.
CPC .............. *F24F 11/30* (2018.01); *F24F 11/38* (2018.01); *F24F 11/86* (2018.01); *F25B 49/005* (2013.01);
(Continued)

(58) Field of Classification Search
CPC .. F24F 11/30; F24F 11/62; F24F 11/89; F24F 2110/10; F24F 11/38; F24F 11/86; F24F 2100/12; F25B 49/005; F25B 2600/0253
See application file for complete search history.

(56) References Cited

U.S. PATENT DOCUMENTS

| | | | |
|---|---|---|---|
| 5,960,639 A | 10/1999 | Hammer | |
| 2015/0153085 A1 | 6/2015 | Nakai et al. | |
| 2015/0204594 A1* | 7/2015 | Luo .................. | F25B 49/022 62/115 |

FOREIGN PATENT DOCUMENTS

| | | |
|---|---|---|
| CN | 103375874 A | 10/2013 |
| CN | 104515254 A | 4/2015 |

(Continued)

OTHER PUBLICATIONS

Midea, International Search Report and Written Opinion, PCT/CN2017/078823, dated Mar. 30, 2017, 12 pgs. (No English translation available).

(Continued)

*Primary Examiner* — Elizabeth J Martin
(74) *Attorney, Agent, or Firm* — Morgan, Lewis & Bockius LLP

(57) ABSTRACT

A method of controlling a compressor is disclosed. The method includes: after the compressor is stopped for protection, updating the number of protective stops of the compressor occurring during a current operation of the air conditioner; and when the number of protective stops of the compressor is greater than a first preset number, lowering the frequency of the compressor so that when the compressor restarts the compressor would start and operate at the lowered frequency. Disclosed also is a device for controlling a compressor. Thus, by lowering the frequency of the compressor, the compressor would reach the high or low (Continued)

After the compressor is stopped for protection, updating the number of protective stops occurring during the current operation of the air conditioner — S10

When the number of protective stops of the compressor is greater than a first preset number, lowering the frequency of the compressor so that when the compressor restarts the compressor starts and operates at the lowered frequency — S20 temperature protective value comparatively slowly, so the number of restarts of the compressor can be reduced.

16 Claims, 1 Drawing Sheet

(52) U.S. Cl.
CPC ......... *F25B 49/022* (2013.01); *F24F 2110/12* (2018.01); *F25B 2500/08* (2013.01); *F25B 2500/222* (2013.01); *F25B 2500/26* (2013.01); *F25B 2600/0251* (2013.01); *F25B 2600/0253* (2013.01)

(56) References Cited

FOREIGN PATENT DOCUMENTS

| CN | 104713202 A | 6/2015 |
|---|---|---|
| CN | 104791943 A | 7/2015 |
| CN | 104819547 A | 8/2015 |
| CN | 105928280 A | 9/2016 |
| CN | 107084473 A | 8/2017 |
| EP | 0730721 A1 | 9/1996 |
| JP | H07234044 A | 9/1995 |
| JP | H0861247 A | 3/1996 |
| JP | 2009030915 A | 2/2009 |
| KR | 20060039591 A | 5/2006 |
| KR | 100624710 B1 | 9/2006 |

OTHER PUBLICATIONS

Midea, 1st Office Action, CN 201710206599.8, dated Mar. 4, 2019, 7 pgs. (No English translation available).

GD Midea Air-Conditioning Equipment Co. Ltd.; Midea Group Co. Ltd., Requisition by the Examiner, CA3021241, Oct. 1, 2019, 6 pgs.

\* cited by examiner

METHOD AND DEVICE FOR CONTROLLING A COMPRESSOR

RELATED APPLICATIONS

This application is a continuation application of PCT Patent Application No. PCT/CN2017/078823, entitled "METHOD AND DEVICE FOR CONTROLLING A COMPRESSOR" filed on Mar. 30, 2017, and claims priority to Chinese Patent Application No. 201710206599.8, filed with the Chinese Patent Office on Mar. 30, 2017, and entitled "METHOD AND DEVICE FOR CONTROLLING A COMPRESSOR", both of which are incorporated herein by reference in their entirety.

TECHNICAL FIELD

This disclosure relates generally to the technical field of air conditioners, and more particularly relates to a method and a device for controlling a compressor.

BACKGROUND

When an air conditioner operates under heating mode with relatively high outdoor temperatures, the indoor heat exchanger (i.e., the indoor unit) often overheats. Otherwise when the air conditioner operates in cooling mode with relatively low outdoor temperatures, the indoor heat exchanger (i.e., the indoor unit) temperature would usually run too low. To prevent such situations from happening, the compressor is typically stopped for protection.

After being started, the compressor usually needs to operate at a preset frequency such as around 60 or 90 Hz for over 1 minute. However, if the compressor operates at such frequencies whether under the heating mode with relatively high outdoor temperatures or under the cooling mode with relatively low outdoor temperatures, the evaporator temperature would very soon reach the high or low temperature protective value. Thus, the system implements protection once about every 5 to 7 minutes, resulting in frequent restarts of the compressor.

SUMMARY

A method and a device for controlling a compressor are provided to address the technical problem of frequent restarts of the compressor when operating in heating mode with relatively high outdoor temperatures or operating in cooling mode with relatively low outdoor temperatures.

To the above end, a method of controlling a compressor is provided herein, and the method includes the following operations. After the compressor is stopped for protection, the number of protective stops of the compressor during the current operation of an air conditioner is updated. When the number of protective stops of the compressor is greater than a first preset number, the frequency of the compressor is lowered so that when the compressor restarts it would start and operate at the lowered frequency.

Optionally, in lowering the frequency of the compressor, a preset frequency is lowered in accordance with a first decreasing amplitude corresponding to the current number of protective stops so as to obtain the lowered frequency, wherein the greater the number of protective stops, the greater the first decreasing amplitude.

Optionally, the method further includes the following operations subsequent to updating the number of protective stops of the compressor during the current operation of the air conditioner. When the number of protective stops of the compressor is greater than the first preset number, the number of protective stops is determined as whether it is less than a second preset number which is greater than the first preset number. If the number of protective stops is less than the second preset number, the operation of lowering the frequency of the compressor so that when it is restarted the compressor starts and operates at the lowered frequency is performed. Otherwise if the number of protective stops is greater than or equal to the second preset number, the frequency of the compressor is restored to the preset frequency and the number of protective stops of the compressor is cleared to zero.

Optionally, the method further includes the operation in which the prestored first decreasing amplitude is reduced upon detection of a refrigerant leak.

Optionally, in reducing the prestored first decreasing amplitude upon detection of a refrigerant leak, the number of refrigerant leaks that have been detected is obtained when the refrigerant leak is detected. When the number of detected refrigerant leaks is more than a preset number, the prestored first decreasing amplitude is reduced.

Optionally, the method further includes the following operations in parallel with lowering the frequency of the compressor. The duration of operation of the compressor at the frequency is reduced in parallel with lowering the frequency of the compressor, so that when the compressor restarts the compressor would start and operate at the lowered frequency for the reduced duration.

Optionally, in reducing the duration of operation of the compressor at the frequency, a preset duration of operation is reduced in accordance with a second decreasing amplitude corresponding to the current number of protective stops so as to obtain the reduced duration in which the compressor is to operate at the frequency, wherein the greater the number of protective stops, the greater the second decreasing amplitude.

Optionally, the method further includes the following operations subsequent to updating the number of protective stops of the compressor during the current operation of the air conditioner. When the number of protective stops of the compressor is greater than the first preset number, determining whether the number of protective stops is less than a second preset number which is greater than the first preset number. If the number of protective stops is less than the second preset number, the frequency of the compressor is lowered and the duration of operation of the compressor at the frequency reduced, so that when the compressor restarts the compressor is to start and operate at the lowered frequency for the reduced duration. Otherwise if the number of protective stops is greater than or equal to the second preset number, the frequency of the compressor is restored to the preset frequency and the duration of operation of the compressor at the frequency is restored to the preset duration of operation, and meanwhile the number of protective stops of the compressor is cleared to zero.

Optionally, the method further includes the operation in which the prestored first decreasing amplitude and/or second decreasing amplitude are reduced upon detection of a refrigerant leak.

Optionally, the method further includes the operation in which the number of protective stops is cleared to zero when the air conditioner is powered off.

To accomplish the above object, a device for controlling a compressor is further provided, the device including: an updating module configured for updating the number of protective stops of the compressor during the current operation of an air conditioner, after the compressor is stopped for protection; a frequency adjustment module configured for lowering the frequency of the compressor when the number of protective stops of the compressor is greater than a first preset number so that when it is restarted the compressor would start and operate at the lowered frequency.

Optionally, the frequency adjustment module is configured for lowering a preset frequency in accordance with a first decreasing amplitude corresponding to the current number of protective stops so as to obtain the lowered frequency, wherein the greater the number of protective stops, the greater the first decreasing amplitude.

Optionally, the device further includes: a first determination module configured for determining, when the number of protective stops of the compressor is greater than the first preset number, whether the number of protective stops is less than a second preset number which is greater than the first preset number, wherein the frequency adjustment module is configured for lowering the frequency of the compressor when the number of protective stops is less than the second preset number so that when it is restarted the compressor is to start and operate at the lowered frequency, and for restoring the frequency of the compressor to the preset frequency when the number of protective stops is more than or equal to the second preset number; and a first resetting module configured for clearing the number of protective stops of the compressor to zero when the number of protective stops is more than or equal to the second preset number.

Optionally, the device further includes a first amplitude adjustment module configured for reducing the prestored first decreasing amplitude upon detection of a refrigerant leak.

Optionally, the first amplitude adjustment module includes: an acquisition unit configured for obtaining the number of refrigerant leaks that have been detected upon detection of the refrigerant leak; and an amplitude adjustment unit configured for reducing the prestored first decreasing amplitude when the number of detected refrigerant leaks is more than a preset number.

Optionally, the device further includes: a duration adjustment module configured for reducing the duration of operation of the compressor at the frequency when the number of protective stops of the compressor is greater than the first preset number, so that when the compressor is restarted the compressor is to start and operate at the lowered frequency for the reduced duration.

Optionally, the duration adjustment module is configured for reducing a preset duration of operation in accordance with a second decreasing amplitude corresponding to the current number of protective stops when the number of protective stops of the compressor is more than the first preset number so as to obtain the reduced duration in which the compressor is to operate at the frequency, wherein the greater the number of protective stops, the greater the second decreasing amplitude.

Optionally, the device further includes: a second determination module configured for determining, when the number of protective stops of the compressor is greater than the first preset number, whether the number of protective stops is less than a second preset number which is greater than the first preset number, wherein the frequency adjustment module is further configured for lowering the frequency of the compressor when the number of protective stops is less than the second preset number, and for restoring the frequency of the compressor to the preset frequency when the number of protective stops is more than or equal to the second preset number, while the duration adjustment module is further configured for reducing the duration of operation of the compressor at the frequency when the number of protective stops is less than the second preset number so that when the compressor is restarted the compressor is to start and operate at the lowered frequency for the reduced duration, and configured for restoring the duration of operation of the compressor at the frequency to the preset frequency when the number of protective stops is more than or equal to the second preset number; and a second resetting module configured for clearing the number of protective stops of the compressor to zero when the number of protective stops is more than or equal to the second preset number.

Optionally, the device further includes a second amplitude adjustment module configured for reducing the prestored first decreasing amplitude and/or second decreasing amplitude upon detection of a refrigerant leak.

With the method and device for controlling a compressor that are provided by this disclosure, after the compressor is stopped for protection, the number of protective stops of the compressor during the current operation of the air conditioner is updated, and when the number of protective stops of the compressor is greater than a first preset number, the frequency of the compressor is lowered so that when the compressor is restarted the compressor would start and operate at the lowered frequency. Therefore, by lowering the frequency of the compressor, the compressor would reach the high or low temperature protective value comparatively slowly, so that the number of restarts of the compressor can be reduced.

BRIEF DESCRIPTION OF THE ACCOMPANYING DRAWINGS

Implementations, functional features and advantages in accordance with the present disclosure will now be described in further detail in connection with some illustrative embodiments as well as the accompanying drawings.

DETAILED DESCRIPTION OF ILLUSTRATIVE EMBODIMENTS

It is to be understood that the specific embodiments described herein are intended to merely illustrate rather than limiting the present disclosure.

Methods of controlling a compressor (hereinafter also interchangeably referred to as compressor control methods) are provided herein.

Figure 1:
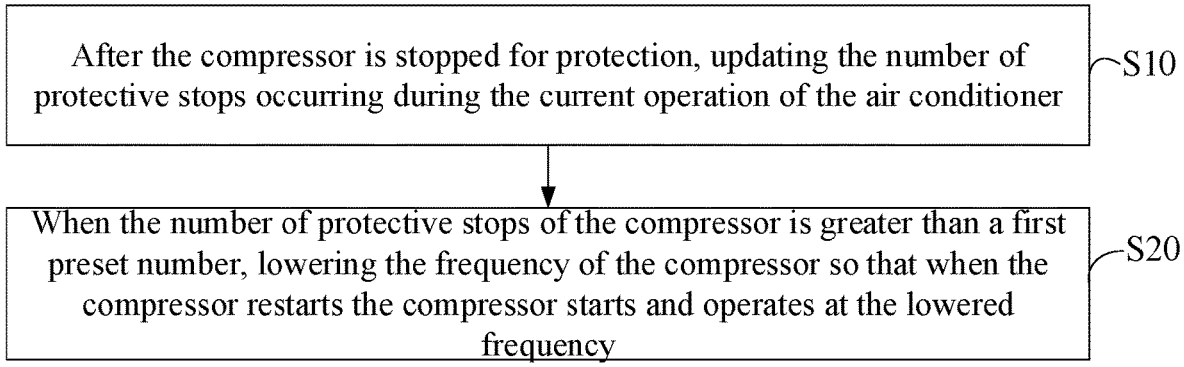
FIG. 1 is an illustrative flowchart of a first embodiment of a method of controlling a compressor in accordance with the present disclosure.

FIG. 1 shows an illustrative flowchart of a first embodiment of a method of controlling a compressor in accordance with this disclosure. In this embodiment, a method of controlling a compressor is provided and includes the following blocks as illustrated in FIG. 1. The method begins at block S10.

In S10, after the compressor is stopped for protection, the number of protective stops of the compressor during the current operation of the air conditioner is updated.

In this embodiment, by "protective stop", it means that when the air conditioner operates under the heating mode and the temperature of the indoor heat exchanger exceeds a preset high temperature protective temperature, the compressor would be stopped for protection; or when the air conditioner operates under the cooling mode and the temperature of the indoor heat exchanger exceeds a preset low temperature protective temperature, the compressor would also be stopped for protection. During the operation of the air conditioner, the temperature of the indoor heat exchanger can be detected in real time or periodically. When the air conditioner operates under the heating mode and the temperature of the indoor heat exchanger exceeds the preset high temperature protective temperature, the compressor would be controlled to lower its frequency. If, after the frequency of the compressor has been lowered to a predetermined frequency, the temperature of the indoor heat exchanger is still higher than the preset high temperature protective temperature, then the compressor would be controlled to stop for protection; that is, the compressor would be restarted. Similarly, when the air conditioner is in cooling operation, if the temperature of the indoor heat exchanger is lower than the preset low temperature protective temperature, then the compressor would be controlled to reduce its frequency. Having the frequency of the compressor been lowered to the predetermined frequency and the temperature of the indoor exchanger is still lower than the preset low temperature protective temperature, then the compressor would be controlled to stop for protection; that means the compressor would be restarted. "Restarts" of the compressor do not include the condition in which the air conditioner is powered down and then restarted.

Each time from the point the air conditioner is started to the point the air conditioner is shutdown is considered as one operation. The number of protective stops can be cleared each time the air conditioner is turned off or after the air conditioner is normally powered on. After the air conditioner is turned on, the number of protective stops would be incremented by one with each protective stop. The method then proceeds to block S20.

In S20, when the number of protective stops of the compressor is greater than a first preset number, the frequency of the compressor is lowered so that when the compressor is restarted the compressor would start and operate at the lowered frequency.

The first preset number may be set by a developer according to needs. For example, the first preset number may be 2; that is, the frequency of the compressor would be lowered at the third protective stop. Each time the number of protective stops is more than the first preset number, the same amount of frequency may be subtracted on the basis of a preset frequency. For example, the first preset number may be 2; that is, at the third protective stop the frequency would be lowered from the preset frequency of 60 HZ to 57 HZ, at the fourth protective stop the frequency would still be lowered from the preset frequency of 60 HZ to 57 HZ, and so on, until the air conditioner is turned off. Alternatively, at each protective stop a different frequency may be subtracted on the basis of the preset frequency. For example, the first preset number may be 2 and the preset frequency may be 60 HZ and at the third protective stop the frequency decreasing amplitude is 20%, then the frequency at the third protective stop would be 60*80%=48 HZ; at the fourth protective stop the frequency decreasing amplitude is 25%, then the frequency at the fourth protective stop would be 60*75%=45 HZ, and so on.

After it is stopped for protection, the compressor would adjust its frequency. Then when it is restarted after this protective stop, the compressor would operate according to the adjusted frequency. The running duration at the adjusted frequency can be set by the developer.

It can be understood that as the number of protective stops of the compressor continues to accumulate, if the number of protective stops of the compressor is not cleared when the air conditioner is powered down, then each time the air conditioner is started the number of protective stops would always be greater than the first preset number. Thus, when the air conditioner is powered off the number of protective stops would be cleared. By "the air conditioner is powered off", it means the air conditioner is turned off or powered down.

With the method of controlling a compressor provided by this embodiment, after the compressor is stopped for protection, the number of protective stops of the compressor during the current operation of the air conditioner is updated, and when the number of protective stops of the compressor is greater than a first preset number, the frequency of the compressor is lowered so that when the compressor is restarted the compressor would start and operate at the lowered frequency. Therefore, by lowering the frequency of the compressor, the compressor would reach the high or low temperature protective value comparatively slowly, so the number of restarts of the compressor can be reduced.

Further, there is provided a second embodiment of the compressor control method according to this disclosure based on the first embodiment. In the second embodiment the block S20, i.e., lowering the frequency of the compressor when the number of protective stops of the compressor is greater than a first preset number, includes: lowering a preset frequency in accordance with a first decreasing amplitude corresponding to the current number of protective stops to obtain the lowered frequency, so that when the compressor is restarted the compressor would start and operate at the lowered frequency, wherein the greater the number of protective stops, the greater the first decreasing amplitude.

The first decreasing amplitude can be represented by a frequency value or a proportional value. Since the greater the number of protective stops the greater the first decreasing amplitude, the decreasing amplitude might be exceedingly large such that the compressor oil level fails to meet the standard and the liquid fails to return. Thus, when the frequency has been lowered to the extreme, the compressor needs to be controlled to re-operate at the preset frequency; that means the method further includes the following operations subsequent to the block S10: when the number of protective stops of the compressor is greater than the first preset number, determining whether the number of protective stops is less than a second preset number which is greater than the first preset number; performing block S20 when the number of protective stops is less than the second preset number; and when the number of protective stops is greater than or equal to the second preset number, restoring the frequency of the compressor to the preset frequency, and clearing the number of protective stops of the compressor.

For example, the first preset number can be 2 and the preset frequency can be 60 HZ, and if at the third protective stop the frequency decreasing amplitude is 20%, then the frequency at the third protective stop would be 60*80%=48 HZ; at the fourth protective stop the frequency decreasing amplitude is 25%, then the frequency at the fourth protective stop would be 60*75%=45 HZ; at the fifth protective stop the frequency decreasing amplitude is 30%, then the frequency at the fifth protective stop would be 60*70%=42 HZ, and so on. As such, at the seventh protective stop the frequency would be 36 HZ which is already too low. Therefore, the second preset number can be determined as 8, and so at the eighth protective stop the frequency of the compressor would be restored to the preset frequency and the number of protective stops of the compressor will be cleared to zero. Thereafter, the above process is restarted; that is, the block S10 is performed.

It will be appreciated that because the air conditioner may leak refrigerant, it may lead to a situation in which the oil level is not up to standard or the liquids fail to return after the frequency is lowered. Thus, the above compressor control method may further include: reducing the prestored first decreasing amplitude upon detection of a refrigerant leak. Thus, by reducing the first decreasing amplitude, the situation can be avoided in which the frequency is reduced by too much such that the liquids cannot be returned or the liquid level is not up to standard. Since the detection of the refrigerant leak may sometimes be inaccurate, the number of the refrigerant leaks that have been detected can be obtained upon detection of the refrigerant leak, and the prestored first decreasing amplitude will be reduced when the number of refrigerant leaks that have been detected is greater than a preset number.

When the number of protective stops is greater than or equal to the second preset number, the frequency of the compressor may not be restored to the preset frequency (i.e., to increase the current frequency of the compressor), and the number of restarts of the compressor may be cleared until the frequency of the compressor reaches the preset frequency, at which time the method goes back to perform the block S10. Those having skill in the art will be able to understand that when the number of protective stops is greater than or equal to the second preset number, a different solution can also be adopted to implement the setting of the preset frequency. For example, the current frequency can be kept unchanged, and after the compressor has operated for a preset number of times at the current frequency, the frequency of the air conditioner can be restored to the preset frequency while the number of restarts of the compressor would be cleared to zero.

Further, there is provided a third embodiment of the compressor control method according to this disclosure based on the first or second embodiment. In the third embodiment the following operation is performed in parallel with lowering the frequency of the compressor: reducing the duration of operation of the compressor at the frequency so that when the compressor is restarted the compressor is to start and operate at the lowered frequency for the reduced duration.

In the solution disclosed in this embodiment, when the number of protective stops of the compressor is greater than the first preset number, both the frequency and the duration of operation at this frequency can be reduced at the same time, so that the duration of operation of the compressor at the relatively high frequency would be even shorter. Because the compressor would operate at the target frequency after having been operating at the high frequency for a preset duration, the indoor heat exchanger would not easily reach the high temperature protective value or low temperature protective value, avoiding frequent restarts of the compressor. In this embodiment, after it is restarted the compressor would be started and operate at the lowered frequency for the reduced duration, so that the compressor can operate at the target frequency (i.e., at the frequency corresponding to the user-set temperature), and determinations can be made according to a preset compressor protection strategy.

Further, there is provided a fourth embodiment of the compressor control method according to this disclosure based on the third embodiment. In this embodiment, the operation of reducing the duration of operation of the compressor at the frequency includes: reducing a preset duration of operation in accordance with a second decreasing amplitude corresponding to the current number of protective stops to obtain the reduced duration in which the compressor is to operate at the frequency, wherein the greater the number of protective stops, the greater the second decreasing amplitude.

The first decreasing amplitude can be represented by a frequency value or a proportional value. Since the greater the number of protective stops the greater the first decreasing amplitude, the decreasing amplitude might be exceedingly large such that the compressor oil level fails to meet the standard and the liquid fails to return. Thus, when the frequency has been lowered to the extreme, the compressor needs to be controlled to re-operate at the preset frequency; that means the method may further include the following operations subsequent to the block S10.

That is, when the number of protective stops of the compressor is greater than the first preset number, the number of protective stops determined as to whether it is less than a second preset number which is greater than the first preset number. If the number of protective stops is less than the second preset number, the frequency of the compressor would be lowered and the duration of operation of the compressor at the frequency would also be reduced, so that when it is restarted the compressor would start and operate at the lowered frequency for the reduced duration. Otherwise if the number of protective stops is greater than or equal to the second preset number, the frequency of the compressor would be restored to the preset frequency and the duration of operation of the compressor at the frequency would be restored to the preset duration of operation, and meanwhile the number of protective stops of the compressor would also be cleared to zero.

It will be appreciated that because the air conditioner may leak refrigerant, it may lead to a situation in which the oil level is not up to standard or the liquids fail to return after the frequency is lowered. Thus, the compressor control method may further include: reducing the prestored first decreasing amplitude and/or second decreasing amplitude upon detection of a refrigerant leak. Thus, by reducing the first decreasing amplitude and/or second decreasing amplitude, the situation can be avoided in which the frequency or the preset duration of operation is reduced by too much such that the liquids cannot return or the liquid level is not up to standard. Since the detection of the refrigerant leakage may sometimes be inaccurate, the prestored first decreasing amplitude and/or second decreasing amplitude may be reduced when the number of refrigerant leaks that have been detected is greater than the preset number.

When the number of protective stops is greater than or equal to the second preset number, a different solution can also be adopted to implement the setting of the preset frequency and the setting of the preset duration of operation. For example, the current frequency and duration of operation can be kept unchanged, and after the compressor has operated for a preset number of times at the current frequency and duration, the frequency of the air conditioner can be restored to the preset frequency while the number of restarts of the compressor can be cleared to zero. Alternatively, when the number of protective stops is greater than or equal to the second preset number, the frequency of the compressor may not be restored to the preset frequency and the duration may not be restored to the preset duration (i.e., to increase the current frequency and duration of operation of the compressor), and the number of restarts of the compressor may be cleared until the frequency of the compressor reaches the preset frequency and the duration reaches the preset duration of operation, at which time the method goes back to perform the block S10.

The compressor control method meant to be protected by this disclosure can be operated in a control chip of an air conditioner where control chip further includes a memory. The memory can be carried in the control chip or can also be other storage media such as a flash memory. After the air conditioner is started, a compressor control program corresponding to the compressor control method can be loaded to the memory of the control chip for running.

A device for controlling a compressor (hereinafter also interchangeably referred to as a compressor control device) is further provided by the disclosure.

Figure 2:
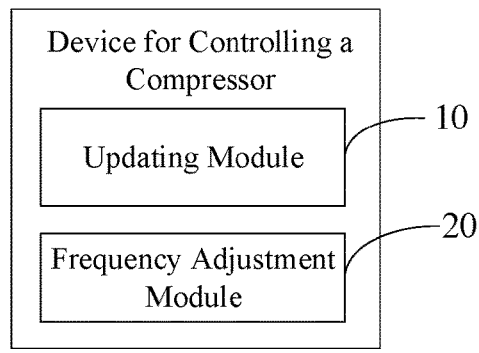
FIG. 2 is an illustrative functional block diagram of a first embodiment of a device for controlling a compressor in accordance with the present disclosure.
Figure 3:
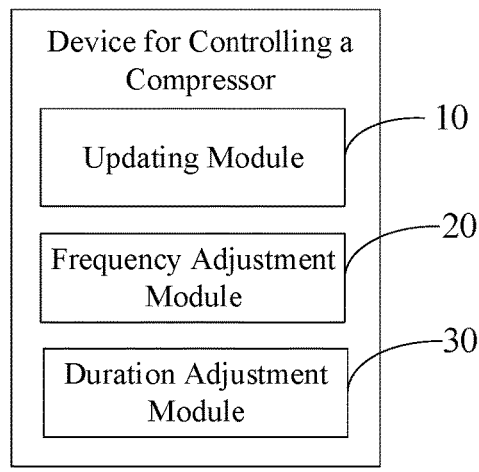
FIG. 3 is an illustrative functional block diagram of a third embodiment of a device for controlling a compressor in accordance with the present disclosure.

FIG. 2 is an illustrative functional block diagram of a first embodiment of a device for controlling a compressor in accordance with this disclosure.

It should be emphasized that for those having skill in the art, the functional block diagram shown in FIG. 2 is merely an illustrative diagram of an exemplary embodiment and that those skilled in the art can easily add new functional modules based on the functional modules of the compressor control device as illustrated in FIG. 2. Names of the various functional modules are custom names which are merely used to facilitating the understanding of various program functional blocks of the compressor control device, and are not intended to limit the technical solution of the present disclosure. At the heart of the technical solution according to this disclosure are the functions to be accomplished by various functional modules with custom names.

This embodiment provides a device for controlling a compressor, and the compressor control device includes an updating module 10 and a frequency adjustment module 20.

The updating module 10 can be configured for updating the number of protective stops of the compressor during the current operation of an air conditioner, after the compressor is stopped for protection.

In this embodiment, by "protective stop", it means that when the air conditioner operates under the heating mode and the temperature of the indoor heat exchanger goes beyond a preset high temperature protective temperature, the compressor would be stopped for protection; or when the air conditioner operates under the cooling mode and the temperature of the indoor heat exchanger exceeds a preset low temperature protective temperature, the compressor would also be stopped for protection. During the operation of the air conditioner, the temperature of the indoor heat exchanger can be detected in real time or periodically. When the air conditioner operates under the heating mode and the temperature of the indoor heat exchanger goes beyond the preset high temperature protective temperature, the compressor would be controlled to lower its frequency. If, after the frequency of the compressor has been lowered to a predetermined frequency, the temperature of the indoor heat exchanger is still higher than the preset high temperature protective temperature, then the compressor would be controlled to stop for protection; that is, the compressor would be restarted. Similarly, when the air conditioner is in cooling operation, if the temperature of the indoor heat exchanger is lower than the preset low temperature protective temperature, then the compressor would be controlled to reduce its frequency. Having the frequency of the compressor been lowered to the predetermined frequency and the temperature of the indoor exchanger is still lower than the preset low temperature protective temperature, then the compressor would be controlled to stop for protection; namely, the compressor would be restarted. "Restarts" of the compressor does not include the condition in which the air conditioner is powered down and then restarted.

Each time from the point the air conditioner is started to the point the air conditioner is shutdown is considered as one operation. The number of protective stops can be cleared each time the air conditioner is turned off or after the air conditioner is normally powered on. After the air conditioner is turned on, the number of protective stops would be incremented by one with each protective stop.

The frequency adjustment module 20 can be configured for lowering the frequency of the compressor when the number of protective stops of the compressor is greater than a first preset number, so that when the compressor is restarted the compressor would start and operate at the lowered frequency.

The first preset number may be set by a developer according to needs. For example, the first preset number may be 2; that is, the frequency of the compressor would be lowered at the third protective stop. Each time the number of protective stops is more than the first preset number, the same amount of frequency may be subtracted on the basis of a preset frequency. For example the first preset number may be 2; that is, at the third protective stop the frequency would be lowered from the preset frequency of 60 HZ to 57 HZ, at the fourth protective stop the frequency would still be lowered from the preset frequency of 60 HZ to 57 HZ, and so on until the air conditioner is turned off. Alternatively, at each protective stop a different frequency may be subtracted on the basis of the preset frequency. For example, the first preset number may be 2 and the preset frequency may be 60 HZ and at the third protective stop the frequency decreasing amplitude is 20%, then the frequency at the third protective stop would be 60*80%=48 HZ; at the fourth protective stop the frequency decreasing amplitude is 25%, then the frequency at the fourth protective stop would be 60*75%=45 HZ, and so on.

After it is stopped for protection, the compressor would adjust its frequency. Then when it is restarted after this protective stop, the compressor would operate according to the adjusted frequency. The running duration at the adjusted frequency can be set by the developer.

It can be understood that as the number of protective stops of the compressor continues to accumulate, if the number of protective stops of the compressor is not cleared when the air conditioner is powered down, then each time the air conditioner is started the number of protective stops would always be greater than the first preset number. This, the compressor control device further includes a third resetting module configured for clearing the number of protective stops when the air conditioner is powered off. By "the air conditioner is powered off", it means the air conditioner is turned off or powered down.

With the device for controlling a compressor provided by this embodiment, after the compressor is stopped for protection, the number of protective stops of the compressor during the current operation of the air conditioner is updated, and when the number of protective stops of the compressor is greater than a first preset number, the frequency of the compressor is lowered so that when the compressor is restarted the compressor would be started and operate at the lowered frequency. Therefore, by lowering the frequency of the compressor, the compressor would reach the high or low temperature protective value comparatively slowly, so the number of restarts of the compressor can be reduced.

Further, there is provided a second embodiment of the compressor control device in accordance with this disclosure based on the first device embodiment. In this embodiment the frequency adjustment module 20 is configured for lowering a preset frequency in accordance with a first decreasing amplitude corresponding to the current number of protective stops so as to obtain the lowered frequency, wherein the greater the number of protective stops, the greater the first decreasing amplitude.

The first decreasing amplitude can be represented by a frequency value or a proportional value. Since the greater the number of protective stops the greater the first decreasing amplitude, the decreasing amplitude might be exceedingly large such that the compressor oil level fails to meet the standard and the liquid fails to return. Thus, when the frequency has been lowered to the extreme, the compressor needs to be controlled to re-operate at the preset frequency; that means the device can further include: a first determination module configured for determining, when the number of protective stops of the compressor is greater than the first preset number, whether the number of protective stops is less than a second preset number which is greater than the first preset number, wherein the frequency adjustment module 20 is configured for lowering the frequency of the compressor when the number of protective stops is less than the second preset number so that when it is restarted the compressor would start and operate at the lowered frequency, and configured for restoring the frequency of the compressor to the preset frequency when the number of protective stops is more than or equal to the second preset number; and a first resetting module configured for clearing the number of protective stops of the compressor when the number of protective stops is less than the second preset number.

For example, the first preset number can be 2 and the preset frequency can be 60 HZ, and if at the third protective stop the frequency decreasing amplitude is 20%, then the frequency at the third protective stop would be 60*80%=48 HZ; at the fourth protective stop the frequency decreasing amplitude is 25%, then the frequency at the fourth protective stop would be 60*75%=45 HZ; at the fifth protective stop the frequency decreasing amplitude is 30%, then the frequency at the fifth protective stop would be 60*70%=42 HZ, and so on. As such, at the seventh protective stop the frequency would be 36 HZ which is already too low. Therefore, the second preset number can be determined as 8, and so at the eighth protective stop the frequency of the compressor would be restored to the preset frequency and the number of protective stops of the compressor would also be cleared to zero. Thereafter, the above process is restarted.

It will be appreciated that because the air conditioner may leak refrigerant, it may lead to a situation in which the oil level is not up to standard or the liquids fail to be returned after the frequency is lowered. Thus, the above compressor control device may further include a first amplitude adjustment module configured for reducing the prestored first decreasing amplitude upon detection of a refrigerant leak. Thus, by reducing the first decreasing amplitude, the situation can be avoided in which the frequency is reduced by too much such that the liquids cannot be returned or the liquid level is not up to standard. Since the detection of the refrigerant leakage may sometimes be inaccurate, the first amplitude adjustment module can include: an acquisition unit configured for detecting the number of the refrigerant leaks that have been detected upon detection of the refrigerant leak; and an amplitude adjustment unit configured for reducing the prestored first decreasing amplitude when the number of refrigerant leaks that have been detected is greater than a preset number.

When the number of protective stops is greater than or equal to the second preset number, the frequency of the compressor may not be restored to the preset frequency (i.e., to increase the current frequency of the compressor), and the number of restarts of the compressor may be cleared until the frequency of the compressor reaches the preset frequency, at which time the method goes back to perform the block S10. Those having skill in the art will be able to understand that when the number of protective stops is greater than or equal to the second preset number, a different solution can also be adopted to implement the setting of the preset frequency. For example, the current frequency can be kept unchanged, and after the compressor has operated for a preset number of times at the current frequency, the frequency of the air conditioner can be restored to the preset frequency while the number of restarts of the compressor would be cleared to zero.

Further, there is provided a third embodiment of the compressor control device according to this disclosure based on the first or the second device embodiment. In the third embodiment the compressor control device further includes: a duration adjustment module 30 configured for lowering the duration of operation of the compressor at the frequency when the number of protective stops of the compressor is greater than the first preset number, so that when the compressor is restarted the compressor would start and operate at the reduced frequency for the reduced duration.

In the solution disclosed in this embodiment, when the number of protective stops of the compressor is greater than the first preset number, both the frequency and the duration of operation at this frequency can be reduced at the same time, so that the duration of operation of the compressor at the relatively high frequency would be even shorter. Because the compressor would operate at the target frequency after having been operating at the high frequency for a preset duration, the indoor heat exchanger would not easily reach the high temperature protective value or low temperature protective value, avoiding frequent restarts of the compressor. In this embodiment, after it is restarted the compressor would be started and operate at the lowered frequency for the reduced duration, so that the compressor can operate at the target frequency (i.e., at the frequency corresponding to the user-set temperature), and determinations can be made according to a preset compressor protection strategy.

It will be appreciated that because the air conditioner may leak refrigerant, it may lead to a situation in which the oil level is not up to standard or the liquids fail to return after the frequency is lowered. Thus, the compressor control device may further include a second amplitude adjustment module configured for reducing the prestored first decreasing amplitude and/or second decreasing amplitude upon detection of a refrigerant leak. Therefore, by reducing the first decreasing amplitude and/or second decreasing amplitude, the situation can be avoided in which the frequency or the preset duration of operation is reduced by too much such that the liquids cannot return or the liquid level is not up to standard. Since the detection of the refrigerant leakage may sometimes be inaccurate, the prestored first decreasing amplitude and/or second decreasing amplitude may be reduced when the number of refrigerant leaks that have been detected is greater than the preset number.

Further, there is provided a fourth embodiment of compressor control device in accordance with this disclosure based on the third device embodiment. In the fourth embodiment the duration adjustment module 30 is further configured for reducing a preset duration of operation in accordance with a second decreasing amplitude corresponding to the current number of protective stops so as to obtain the reduced duration in which the compressor is to operate at the frequency, wherein the greater the number of protective stops, the greater the second decreasing amplitude.

The first decreasing amplitude can be represented by a frequency value or a proportional value. Since the greater the number of protective stops the greater the first decreasing amplitude, the decreasing amplitude might be exceedingly large such that the compressor oil level fails to meet the standard and the liquid fails to return. Thus, when the frequency has been lowered to the extreme, the compressor needs to be controlled to re-operate at the preset frequency; that means the device can further include: a second determination module configured for determining, when the number of protective stops of the compressor is greater than the first preset number, whether the number of protective stops is less than a second preset number which is greater than the first preset number, wherein the frequency adjustment module 20 is further configured for lowering the frequency of the compressor when the number of protective stops is less than the second preset number and for restoring the frequency of the compressor to the preset frequency when the number of protective stops is more than or equal to the second preset number, and the duration adjustment module 30 is further configured for reducing the duration of operation of the compressor at the frequency when the number of protective stops is less than the second preset number so that when the compressor is restarted the compressor would start and operate at the lowered frequency for the reduced duration and for restoring the duration of operation of the compressor at the frequency to the preset frequency when the number of protective stops is more than or equal to the second preset number; and a second resetting module configured for clearing the number of protective stops of the compressor to zero when the number of protective stops is more than or equal to the second preset number.

When the number of protective stops is greater than or equal to the second preset number, a different solution can also be adopted to implement the setting of the preset frequency and the setting of the preset duration of operation. For example, the current frequency and duration of operation can be kept unchanged, and after the compressor has operated for a preset number of times at the current frequency and duration, the frequency of the air conditioner can be restored to the preset frequency while the number of restarts of the compressor can be cleared to zero. Alternatively, when the number of protective stops is greater than or equal to the second preset number, the frequency of the compressor may not be restored to the preset frequency and the duration may not be restored to the preset duration (i.e., to increase the current frequency and duration of the compressor), and the number of restarts of the compressor may be cleared until the frequency of the compressor reaches the preset frequency and the duration reaches the preset duration of operation, at which time the compressor is redetected as to whether it is stopped for protection, and after the compressor has been detected as stopped for protection, the number of protective stops of the compressor during the current operation of the air conditioner is updated.

It should be noted that, as used herein, the terms "including," "comprising," or any other variations thereof are intended to cover a non-exclusive inclusion such that a process, method, article, or apparatus that includes a series of elements includes not only those elements, but other elements as well that have not expressly listed, or further includes elements inherent to such processes, methods, articles, or apparatuses. Without further limitations, an element modified by the phrase "including a . . . " does not exclude the existence of additional identical elements in the process, method, article, or apparatus that includes this element.

Sequence numbers applied to the foregoing embodiments according to the present disclosure are merely for description purposes and are not intended to indicate the advantages and disadvantages of these embodiments.

Through the above description of the embodiments, those skilled in the art can clearly understand that the above-mentioned method embodiments can be implemented by means of software plus a necessary universal hardware platform. Of course, they can also be implemented by hardware, but in many cases the former will be better. Based on such an understanding, the essential technical solution of this disclosure, or the portion that contributes to the prior art may be embodied as software products. Computer software products can be stored in a storage medium (such as a ROM/RAM, a magnetic disk, or an optical disc), and can include multiple instructions that when executed cause a terminal device (e.g., a cell phone, a computer, a cloud server, an air conditioner, or a network device, etc.), to execute the methods in accordance with various embodiments.

The foregoing merely illustrates some exemplary embodiments of this disclosure and is not intended as limiting the patentable scope of the disclosure. Any equivalent configurational or flow transformations made taking advantage of the foregoing description and accompanying drawings of this disclosure, or any direct or indirect applications in other related technical fields will all be compassed within the patentable scope of this disclosure.

What is claimed is:
1. A method of controlling a compressor, comprising:
after the compressor is stopped for protection, updating a number of protective stops of the compressor occurring during a current operation of an air conditioner;
when the number of protective stops of the compressor is greater than a first preset number, lowering a frequency of the compressor so that when the compressor restarts, the compressor starts and operates at the lowered frequency, wherein lowering the frequency of the compressor includes lowering a preset frequency in accordance with a first decreasing amplitude corresponding to a current number of protective stops to obtain the lowered frequency, and wherein the greater the number of protective stops, the greater the first decreasing amplitude;
determining, when the number of protective stops of the compressor is greater than the first preset number, whether the number of protective stops is less than a second preset number which is greater than the first preset number;
when the number of protective stops is less than the second preset number, performing the operation of lowering the frequency of the compressor so that when the compressor restarts the compressor starts and operates at the lowered frequency; and
otherwise, when the number of protective stops is greater than or equal to the second preset number, restoring the frequency of the compressor to the preset frequency, and clearing the number of protective stops of the compressor to zero.

2. The method of claim 1, further comprising:
reducing the first decreasing amplitude upon detection of a refrigerant leak.

3. The method of claim 2, wherein reducing the first decreasing amplitude upon detection of the refrigerant leak comprises:
obtaining a number of refrigerant leaks that have been detected upon detection of the refrigerant leak; and
reducing the first decreasing amplitude when the number of detected refrigerant leaks is more than a preset number.

4. The method of claim 1, further comprising, in parallel with lowering the frequency of the compressor:
reducing a duration of operation of the compressor at the frequency so that when the compressor restarts the compressor starts and operates at the lowered frequency for the reduced duration.

5. The method of claim 4, wherein reducing the duration of operation of the compressor at the frequency comprises:
reducing a preset duration of operation in accordance with a second decreasing amplitude corresponding to a current number of protective stops to obtain the reduced duration in which the compressor is to operate at the frequency, wherein the greater the number of protective stops, the greater the second decreasing amplitude.

6. The method of claim 5, further comprising, subsequent to updating the number of protective stops of the compressor during the current operation of the air conditioner:
determining, when the number of protective stops of the compressor is greater than the first preset number, whether the number of protective stops is less than a second preset number which is greater than the first preset number;
when the number of protective stops is less than the second preset number, lowering the frequency of the compressor and reducing the duration of operation of the compressor at the frequency, so that when the compressor restarts the compressor starts and operates at the lowered frequency for the reduced duration; otherwise
when the number of protective stops is greater than or equal to the second preset number, restoring the frequency of the compressor to the preset frequency, and the duration of operation of the compressor at the frequency to the preset duration of operation, and meanwhile clearing the number of protective stops of the compressor to zero.

7. The method of claim 5, further comprising:
reducing the first decreasing amplitude and/or second decreasing amplitude upon detection of a refrigerant leak.

8. The method of claim 1, further comprising:
clearing the number of protective stops of the compressor when the air conditioner is powered off.

9. A non-transitory computer-readable storage medium storing one or more programs, the one or more programs comprising instructions which, when executed by an electronic device with a compressor, one or more processors, and memory, cause the electronic device to:
after the compressor is stopped for protection, update a number of protective stops of the compressor occurring during a current operation of an air conditioner;
when the number of protective stops of the compressor is greater than a first preset number, lower a frequency of the compressor so that when the compressor restarts, the compressor starts and operates at the lowered frequency, wherein lowering the frequency of the compressor includes lowering a preset frequency in accordance with a first decreasing amplitude corresponding to a current number of protective stops to obtain the lowered frequency, and wherein the greater the number of protective stops, the greater the first decreasing amplitude;
determine, when the number of protective stops of the compressor is greater than the first preset number, whether the number of protective stops is less than a second preset number which is greater than the first preset number;
when the number of protective stops is less than the second preset number, perform the operation of lowering the frequency of the compressor so that when the compressor restarts the compressor starts and operates at the lowered frequency; and
otherwise, when the number of protective stops is greater than or equal to the second preset number, restore the frequency of the compressor to the preset frequency, and clear the number of protective stops of the compressor to zero.

10. The computer-readable storage medium of claim 9, including instructions which, when executed by the electronic device, cause the electronic device to:
reduce the first decreasing amplitude upon detection of a refrigerant leak.

11. The computer-readable storage medium of claim 10, wherein reducing the first decreasing amplitude upon detection of the refrigerant leak comprises:
obtaining a number of refrigerant leaks that have been detected upon detection of the refrigerant leak; and
reducing the first decreasing amplitude when the number of detected refrigerant leaks is more than a preset number.

12. The computer-readable storage medium of claim 9, including instructions which, when executed by the electronic device, cause the electronic device to, in parallel with lowering the frequency of the compressor:
reduce a duration of operation of the compressor at the frequency so that when the compressor restarts the compressor starts and operates at the lowered frequency for the reduced duration.

13. The computer-readable storage medium of claim 12, wherein reducing the duration of operation of the compressor at the frequency comprises:
reducing a preset duration of operation in accordance with a second decreasing amplitude corresponding to a current number of protective stops to obtain the reduced duration in which the compressor is to operate at the frequency, wherein the greater the number of protective stops, the greater the second decreasing amplitude.

14. The computer-readable storage medium of claim 13, including instructions which, when executed by the electronic device, cause the electronic device to, subsequent to updating the number of protective stops of the compressor during the current operation of the air conditioner:
determine, when the number of protective stops of the compressor is greater than the first preset number, whether the number of protective stops is less than a second preset number which is greater than the first preset number;

when the number of protective stops is less than the second preset number, lower the frequency of the compressor and reducing the duration of operation of the compressor at the frequency, so that when the compressor restarts the compressor starts and operates at the lowered frequency for the reduced duration; otherwise when the number of protective stops is greater than or equal to the second preset number, restore the frequency of the compressor to the preset frequency, and the duration of operation of the compressor at the frequency to the preset duration of operation, and meanwhile clearing the number of protective stops of the compressor to zero.

15. The computer-readable storage medium of claim 13, including instructions which, when executed by the electronic device, cause the electronic device to:

reduce the first decreasing amplitude and/or second decreasing amplitude upon detection of a refrigerant leak.

16. The computer-readable storage medium of claim 9, including instructions which, when executed by the electronic device, cause the electronic device to:

clear the number of protective stops of the compressor when the air conditioner is powered off.

* * * * *